(Model.)  2 Sheets—Sheet 1.

E. B. PORTER.
FISHING REEL.

No. 497,341. Patented May 16, 1893.

WITNESSES:
Donn Twitchell
C. Sedgwick

INVENTOR:
E. B. Porter
BY
Munn & Co
ATTORNEYS.

THE NORRIS PETERS CO., PHOTO-LITHO., WASHINGTON, D. C.

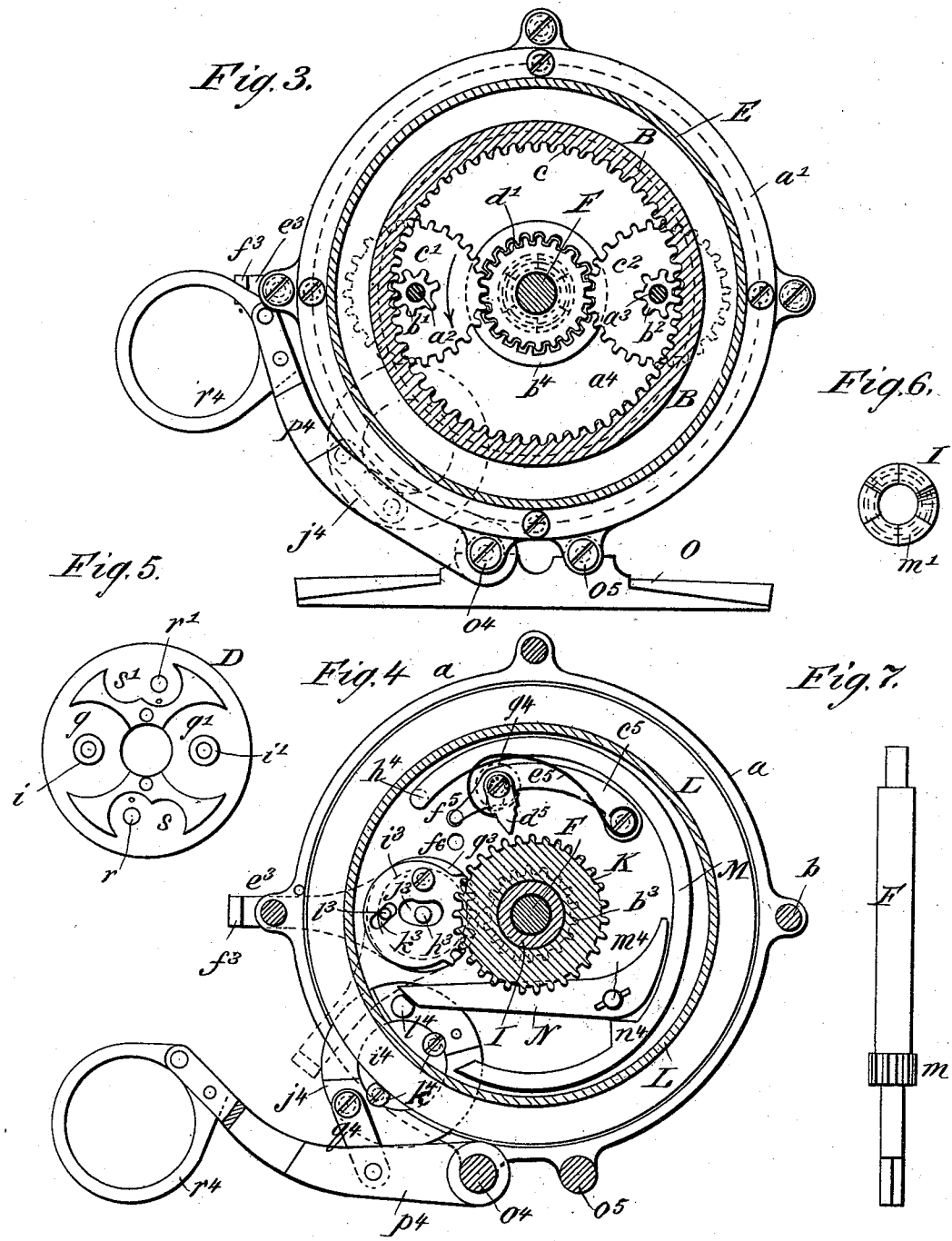

UNITED STATES PATENT OFFICE.

ELBERT B. PORTER, OF PENN YAN, NEW YORK.

FISHING-REEL.

SPECIFICATION forming part of Letters Patent No. 497,341, dated May 16, 1893.

Application filed March 13, 1890. Serial No. 343,696. (Model.)

*To all whom it may concern:*

Be it known that I, ELBERT B. PORTER, of Penn Yan, in the county of Yates and State of New York, have invented a new and Improved Fishing-Reel, of which the following is a specification, reference being had to the annexed drawings, forming a part thereof, in which—

Figure 1:
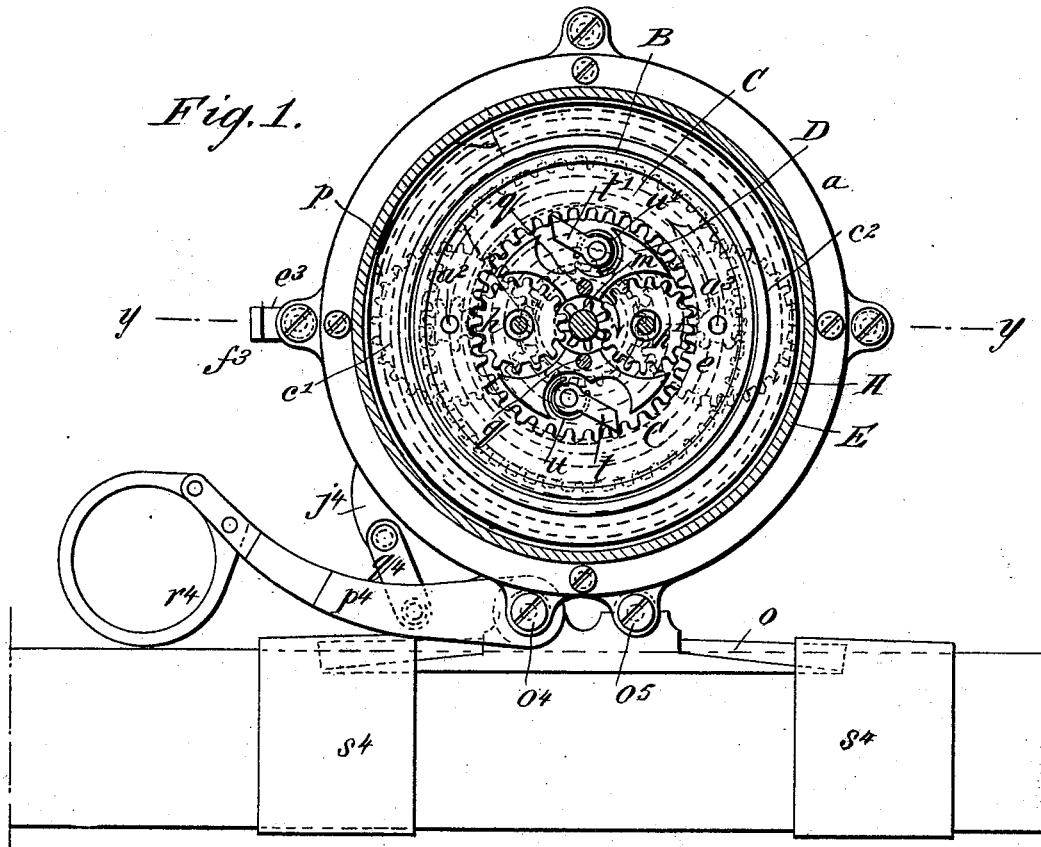
Figure 2:
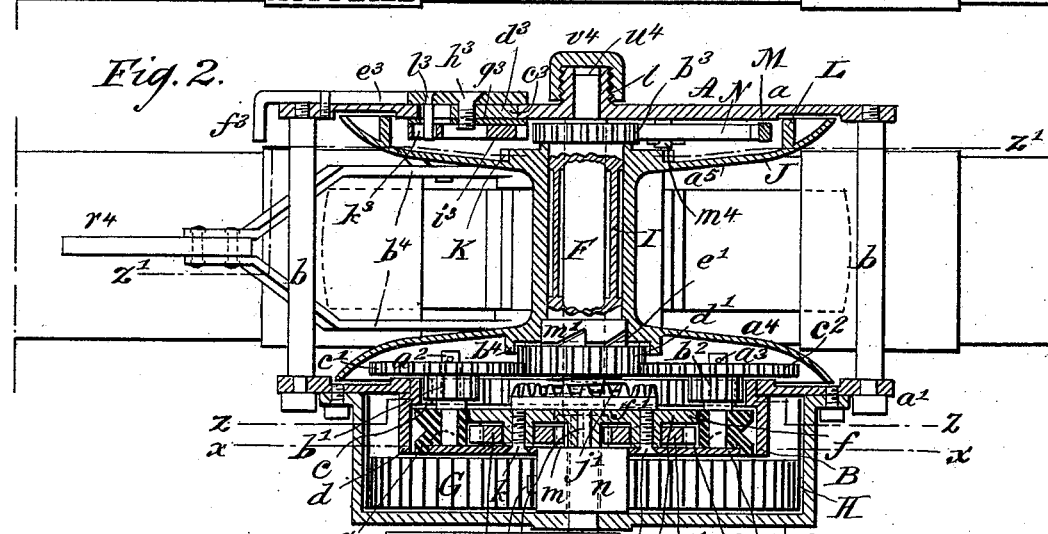

Figure 1 is a side sectional elevation, the section being taken on line $x$—$x$ in Fig. 2. Fig. 2 is a horizontal section taken on line $y$—$y$ in Fig. 1. Fig. 3 is a vertical transverse section taken on line $z$—$z$ in Fig. 2. Fig. 4 is a vertical transverse section taken on line $z'$—$z'$ in Fig. 2. Fig. 5 is a detail view of the chambered disk. Fig. 6 is a side elevation of a portion of the clutch; and Fig. 7 is a side elevation of the shaft.

Similar letters of reference indicate corresponding parts in all the views.

The object of my invention is to construct a fishing reel in which the line may be paid out freely or with any desired amount of friction, and in which the line may be wound by a crank through the medium of a spring, thereby maintaining a continual tension on the line.

My object is further, to provide means for retarding the motion of the reel, at the same time giving an alarm so as to notify the fisherman that the hook has been taken, and at the same time to prevent the reel from making an undue number of revolutions under a momentary impulse.

My invention consists in the combination with a reel, of a system of planetary gearing arranged between the shaft of the reel and the spring and also between the spring and the reel, whereby the spring may be wound and the reel may be revolved simultaneously.

The invention also consists in mechanism for connecting the spring actuated wheels with the reel, and in brake mechanism for controlling the motion of the reel, all as will be hereinafter more fully described.

The frame A of the reel is composed of the back plate $a$, the front plate $a'$ and the connecting bars $b$. In an aperture in the front plate $a'$ is fitted a ring B, which projects beyond the outer face of the plate $a'$ and is made in two diameters. The smaller diameter is provided with internal cogs $c$. The part $d$, which is the larger diameter, projects beyond the face of the plate $a'$ and receives the ring C. The ring C is provided with internal cogs $e$, and with a plain internal surface $f$ to which is fitted a recessed disk D (shown in detail in Fig. 5). The said recessed disk D is provided upon diametrically opposite sides of the axis of the disk with annular recesses $g$, $g'$, to which are fitted the spur wheels $h$, $h'$. The said spur wheels are arranged to revolve on the bosses $i$, $i'$, and are held in place by the plate $j$ fitted to a recess in the outer face of the ring C, and secured in place by screws $k$, $k'$ fitting screw threaded holes in the bosses $i$, $i'$.

To the front plate $a'$ of the reel is fitted a cap E, in which is journaled one end of the shaft F, the other end being journaled in the boss $l$ at the center of the rear plate $a$. To the shaft F is attached a pinion $m$ which engages the spur wheels $h$, $h'$. Upon the shaft F, between the disk D and the cap E, is loosely placed a hub or collar $n$, provided with a hook $o$ which projects into a hole in the inner end of a volute spring G. The outer end of the said volute spring is attached to a drag spring H, which fits tightly into the cap E, the said spring being provided with a stud $p$ which enters a hole in the outer end of the spring G. The drag spring H is wider than the spring G, and serves to hold the outer end of the said spring G under all circumstances when the reel is working normally; but when the said spring G is overwound, it will cause the drag spring H to slip, thereby preventing the breaking of the spring G. The hub $n$ is provided with two studs $q$ which enter holes in the plate D. Upon studs $r$, $r'$ in the recesses $s$, $s'$ of the disk D are placed pawls $t$, $t'$ which engage the cogs of the ring C, the said pawls being provided with springs $u$, $u'$ arranged to hold said pawls in engagement with the cogs of the ring C. In the ring C are inserted studs $a^2$, $a^3$, which project from the inner face of the said ring at diametrically opposite points, and upon the said studs are placed pinions $b'$, $b^2$ which engage the cogs $c$ on the inner surface of the ring B, and to the said pinions $b'$, $b^2$ are attached the spur wheels $c'$, $c^2$, which engage a pinion $d'$ placed loosely on the shaft F. The said pinion $d'$ has a wide face and is provided upon its inner side with pointed teeth $e'$. To the inner face of the recessed disk D is secured a crown wheel $f'$ whose teeth correspond in number with those of the pinion $d'$. Between the pinion $d'$ and the wheel $f'$ is placed a spiral spring $j'$ which surrounds the shaft F and exerts a pressure upon the pinion $d'$.

Upon the shaft F is placed a sleeve I, which is provided with clutch teeth $m'$ which are truncated, the said truncated teeth being adapted for engagement with the teeth $e'$. To the opposite end of the sleeve I, is secured a pinion $b^3$.

To an aperture $c^3$ in the plate $a$ is fitted a disk $d^3$, and to the said disk is attached a lever $e^3$ which extends along the face of the plate $a$ and projects over the edge thereof, forming a handle $f^3$ by which the said lever may be moved. To the inner face of the disk $d^3$ is secured a plate $g^3$ which projects beyond the edges of the disk $d^3$ and over the inner surface of the plate $a$. The lever $e^3$, disk $d^3$ and plate $g^3$ are connected by a screw $h^3$, and to the plate $g^3$ is pivoted eccentrically a mutilated pinion $i^3$. The said pinion is provided with a curved slot $j^3$ at the center thereof, and with an oblique slot $k^3$ in the side diametrically opposite the teeth of the pinion. The lever $e^3$ carries a stud $l^3$ which projects through the slot $k^3$ of the mutilated pinion $i^3$. By moving the lever $e^3$ forward into the position indicated by dotted lines in Fig. 1, the first part of the movement (by the engagement of the stud $l^3$ with the inclined surface at the side of the slot $k^3$) throws the mutilated pinion $i^3$ into engagement with the pinion $b^3$, after which a further movement of the said lever $e^3$ turns the pinion $b^3$ and the sleeve I, to which it is attached, so as to carry forward the clutch teeth $m'$, thereby pushing the pinion $d'$ outward.

Upon the sleeve I is mounted the reel J, which is provided with concave heads $a^4$, $a^5$. The head $a^4$ incloses the spur wheels $c'$, $c^2$ and the pinion $d'$. The concave head $a^5$ incloses the pinion $b^3$, the mutilated pinion $i^3$, and the brake mechanism presently to be described. Upon the end of the reel J adjoining the pinion $d'$, there is a rim $b^4$ which is provided with internal teeth corresponding with the teeth of the said pinion $d'$. When the said pinion is pushed inward by the spring $j'$, it engages the internal teeth of the rim $b^4$, when it is in position to carry the reel J; but when the pinion $d'$ is pushed outward by the engagement of the inclined teeth $m'$ with the inclined teeth $e'$, the pinion $d'$ is moved out of engagement with the teeth of the rim $b^4$, when the reel J is free to turn independently.

Upon the boss of the reel J, within the concave head $a^5$, is formed a spur wheel K. To the inner face of the back plate $a$ is pivoted a curved lever $c^5$ to which is pivoted a click $d^5$ adapted to engage the teeth of the wheel K. To the click $d^5$ is attached a curved spring $e^5$ which is attached to the pivotal screw of the lever $c^5$ and serves to hold the click $d^5$ normally in the central position. The free end of the curved lever $c^5$ is prolonged and turned outwardly toward the plate $a$, and in the said plate are formed two depressions $f^5$, $f^6$, which serve to hold the lever $c^5$ in either of the two positions in which it may be placed. A stud projects from the lever $c^5$ through a slot in the plate $a$, and is provided with a button $g^4$ (shown in dotted lines) by which the lever $c^5$ may be moved inward toward the spur wheel K, so as to bring the click $d^5$ into engagement with the said wheel, or outward so as to disengage the click from the wheel K.

The concave side of the head $a^5$ is provided with a brake rim L, and within the said rim is placed a C-shaped spring brake M, the end $h^4$ of which is pivotally connected with the plate $a$. In the plate $a$ is made an annular recess $i^4$ in which is placed a ring $j^4$ held in place by screws $k^4$ inserted in the plate $a$, with their heads projecting over the ring $j^4$. The ring $j^4$ carries a stud $l^4$, which is adapted to engage the beveled end of an angled lever N pivoted on a stud $m^4$ projecting inward from the plate $a$. The shorter arm of the lever N presses against the C-shaped spring M, near the center thereof, and the said spring M is provided with a lug $n^4$ which strikes the angle of the lever N and serves to limit the motion of the brake spring M, and hold it in its proper place when not intended to act.

The plates $a$, $a'$, are attached to round pillars or bars on the rod plate O by means of screws $o^4$, $o^5$. The pillar into which enter the screws $o^4$ forms the pivot of the forked brake lever $p^4$. The ring $j^4$ is connected with the forked lever $p^4$ by the link $q^4$, and the free extremity of the said forked lever $p^4$ is provided with a ring or loop $r^4$ for receiving the finger. The bar O is secured to the fishing rod in the usual way by means of rings $s^4$, as shown in Fig. 1. The shaft F is squared at its outer end and provided with a hand crank $t^4$ by which it may be turned. The boss $l$ is prolonged beyond the opposite end of the shaft F, forming an oil chamber $u^4$, which is closed by a cap $v^4$ screwed onto the exterior of the said boss $l$.

The operation of my improved reel is as follows: By turning the shaft F by means of the crank $t^4$, the pinion $m$ is made to turn the spur wheels $h$, $h'$, and these by engagement with the internal teeth $e$ of the ring C, tend to carry the recessed disk D and the hub or collar $n$, thus tending to wind the spring G; but the ring C carries the pinions $b'$, $b^2$, which engage the cogs $c$ on the interior of the ring B, and the said pinions $b'$, $b^2$, through the medium of the spur wheels $c'$, $c^2$, attached to the said pinions, tend to move the pinion $d'$ and the reel J in the direction indicated by the arrow in Fig. 3. It will thus be seen that the power is applied to the system between the spring G and the reel J, and that while turning the crank $t^4$, if the resistance of the reel is greater than that of the spring G, the spring will be wound until its resistance equals that of the reel, when the reel will be turned; and if, on the other hand, the resistance of the spring is greater than that of the reel, the spring forms an abutment for the system of gearing, and the reel revolves.

The operation of winding the spring and of revolving the reel may continue simultaneously, or the spring may be wound and the reel may be operated by the power stored in the spring. In either case a continual tension will be maintained upon the line wound on the reel J, so that a fish when engaged by the hook attached to the line is opposed in all his movements by a taut line, the tension of the line being governed by the power of the spring G alone, or by the spring and the brake, or by both together in combination with the click $d^5$, or the power may be increased by a backward pressure on the crank, acting through the pinion, the winding wheels and clicks.

When it desired to disengage the reel J from the propelling mechanism so that the line may be paid out freely, the sleeve I is turned by means of the pinion $b^2$ attached thereto and by the mutilated pinion $i^3$, in the maner before described, thereby bringing the inclined faces of the teeth $m'$ into engagement with the inclined faces of the teeth $e'$, forcing the pinion $d'$ out of engagement with the toothed rim $b^4$, and into engagement with the crown wheel $f'$, thereby permitting the reel to turn freely, and also locking the propelling mechanism so that the spring G will not run down. Its motion may then be controlled by the brake spring M, which is expanded by means of the lever N which is moved by the lever $p^4$ through the medium of the ring $j^4$. It may also be retarded by the click $d^5$, which not only prevents too much of the line from being paid out, but gives warning of the taking of the hook by a fish, when the reel may be brought under control by means of the brake already described, or by turning the crank $t^4$ so as to disengage the teeth $e'$ from the summits of the teeth $m'$, and permit the spring $j'$ to push the pinion $d'$ forward into a re-engagement with the toothed rim $b^4$, thus bringing the reel into connection with the gearing, when the paying out of the line will be against the power of the spring G, and this power may be varied by turning the crank $t^4$ more or less. In this manner the tension of the spring may be adjusted to the power of the fish upon the line so that the reel will take in or pay out the line as may be required, while maintaining sufficient tension to prevent the escape of the fish.

When it is desired to operate the reel with a positive motion the crank $t^4$ is turned backward, when the pawls $t, t'$ engage the teeth of the ring C and impart a positive motion to the said ring and to the gearing connected therewith.

Although I have described my invention in connection with a fishing reel, I do not limit or confine myself to this particular use, as it may be applied to driving any kind of machinery where a yielding or a variable system of gearing is required between the prime motor and the driven machinery; for example, in operating bicyles or tricycles; in hoisting apparatus; in casting a ship's lead, and in converting the unsteady power of a windmill into uniform motive power.

Having thus described my invention, I claim as new and desire to secure by Letters Patent—

1. In a fishing reel, the combination, with a shaft and a reel mounted on one end thereof, of a train of gearing on the shaft outside of the reel and engaging the same, a collar mounted loosely on the shaft adjacent to the train of gearing and having a connection therewith, and a spring having one end connected to said collar, substantially as and for the purpose set forth.

2. In a fishing reel, the combination, with a shaft and a reel, mounted on one end of the shaft, of a train of gearing mounted on the shaft outside of the reel, a sliding pinion on the shaft between the gearing and the reel, the said pinion being operated by the train of gearing and adapted to engage the reel, and means for disengaging the pinion from the reel, substantially as described.

3. In a fishing reel, the combination with a shaft provided with a pinion and reel mounted on the shaft and provided with an internally toothed rim, a train of gearing on the shaft outside of the reel, and with which the pinion on the shaft engages and a sliding pinion on the shaft between the gearing and reel, the said pinion being operated by the train of gearing and adapted to engage the toothed rim of the reel, substantially as herein shown and described.

4. In a fishing reel, the combination with a shaft a sleeve mounted on the shaft, and provided with clutch teeth, and a reel mounted on the sleeve and provided with an internally toothed rim, of a train of gearing mounted on the shaft outside of the reel and operated from the said shaft, a spring pressed and sliding pinion mounted on the shaft and provided with clutch teeth engaging the teeth of the said sleeve and adapted to engage the toothed rim of the reel, and means for disengaging the sliding pinion from the toothed rim of the reel, substantially as herein shown and described.

5. In a fishing reel, the combination of the shaft F, the sleeve I placed upon the said shaft and provided with inclined teeth $m'$, the reel J mounted revolubly upon the sleeve I, the pinion $d'$ mounted loosely upon the shaft F and provided with inclined teeth $e'$, the disk D, the spur wheels $h, h'$ carried by the disk, the pinion $m$ fixed upon the shaft F and arranged to engage the spur wheels $h, h'$, the ring C, the pinions $b', b^2$, the spur wheels $c', c^2$ carried by the said ring C, the internally toothed ring B, the crown wheel $f'$, the spring $j'$ interposed between the said crown wheel and the pinion $d'$, the hub $n$ loosely mounted upon the shaft F and adapted to engage the disk D, and the spring G attached to the hub, substantially as specified.

6. The combination with the sleeve I, provided with the spur pinion $b^3$, of the lever $e^3$ pivoted in the plate $a$, the mutilated pinion $i^3$ provided with the slot $k^3$ and mounted eccentrically upon the lever $e^3$, and the pin $l^3$ projecting from the lever $e^3$ through the slot $k^3$ of the mutilated pinion $i^3$, the said mutilated pinion being adapted to engage the pinion $b^3$, substantially as specified.

7. In a fishing reel, the combination with a central shaft F provided with a pinion $m$, of a disk D mounted upon the said shaft and carrying spur wheels $h$, $h'$ engaged by the pinion $m$, an internally toothed ring C connected with the disk and meshing into the spur wheels $h$, $h'$, a pair of pinions $b'$, $b^2$ carried by the ring C and connected with spur wheels $c'$, $c^2$, an internally toothed ring B, the pinion $d'$ engaged by the spur wheels $c'$, $c^2$ and adapted to carry the reel, a hub $n$ mounted on the shaft F, and the spring G attached to the hub, substantially as specified.

8. In a fishing reel, the combination of a frame and a reel journaled in the said frame and provided with a brake rim on one of its heads, a curved spring within the brake rim and having one end pivoted to the frame, and a lever pivoted to the frame and engaging the spring to force it outward against the inner face of the said rim, substantially as herein shown and described.

9. The combination with the reel J provided with the brake rim L, of the C-shaped spring M pivoted at one end to the plate $a$, the angled lever N adapted to bear against the C-shaped spring at or near the center thereof, and means for tilting the said lever, substantially as specified.

10. The combination with the reel J provided with the brake rim L, of the C-shaped spring M pivoted at one end on the plate $a$, the angled lever N adapted to bear against the C-shaped spring at or near the center thereof, means for tilting the said lever, consisting of the ring $j^4$ provided with the stud $l^4$, the forked lever $p^4$ furnished with the ring $r^4$, and the link $q^4$ connecting the ring $j^4$ and the lever $p^4$, substantially as specified.

11. In a fishing reel, the combination with an automatically operating reel provided with a spur wheel, of a spring pressed click adapted to be moved into engagement with the said spur wheel for retarding the movement of the reel and sounding an alarm when the hook has been taken, substantially as described.

12. The combination with the reel J provided with the spur wheel K, of the lever $c^5$, and the spring actuated click $d^5$ pivoted to the said lever and adapted to engage the teeth of the spur wheel K, substantially as specified.

13. In a fishing reel, the combination with the reel J provided with the spur wheel K, of the curved lever $c^5$ carrying the click $d^5$, the spring $e^5$ connected with the click $d^5$ and with the lever $c^5$, and a button $g^4$ projecting from the lever $c^5$, substantially as specified.

14. In a fishing reel, the combination of the reel J provided with the spur wheel K, the slotted plate $a$ provided with indentations $f^5$, $f^6$, the curved lever $c^5$ pivoted to the said plate $a$ and provided with an elongated end adapted to fit into the indentations $f^5$, $f^6$, the click $d^5$, the double acting spring $e^5$ attached to the click and to the lever $c^5$, and the button $g^4$ projecting through the slot of the plate $a$, substantially as specified.

15. In a fishing reel, the combination of a reel body, a shaft, a pinion gearing with the driving mechanism and with the reel body and provided with clutch teeth, a sleeve extending through the reel body and provided with clutch teeth adapted to engage with the clutch teeth on said pinion, a lever outside the reel case, and connections substantially as described between said lever and said sleeve, whereby a movement of said lever will rotate said sleeve and release the pinion from engagement with the reel body, substantially as shown and described.

16. In a fishing reel, the combination of the sleeve I provided with a spur wheel or pinion $b^3$, an eccentrically mounted pinion $i^3$, and a lever engaging with said pinion $i^3$ and extending outside of the reel case, substantially as and for the purposes set forth.

ELBERT B. PORTER.

Witnesses:
CHAS. ELMENDORF,
F. TOMPKINS.